US009114955B2

(12) United States Patent
Sakai

(10) Patent No.: US 9,114,955 B2
(45) Date of Patent: Aug. 25, 2015

(54) CONTROL DEVICE FOR ELEVATOR

(75) Inventor: Masaya Sakai, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 483 days.

(21) Appl. No.: 13/521,108

(22) PCT Filed: Dec. 8, 2010

(86) PCT No.: PCT/JP2010/007148

§ 371 (c)(1),
(2), (4) Date: Jul. 9, 2012

(87) PCT Pub. No.: WO2011/108047

PCT Pub. Date: Sep. 9, 2011

(65) Prior Publication Data

US 2013/0018639 A1 Jan. 17, 2013

(30) Foreign Application Priority Data

Mar. 3, 2010 (JP) ................................ 2010-046485

(51) Int. Cl.
*G06F 9/445* (2006.01)
*B66B 1/28* (2006.01)
*B66B 1/30* (2006.01)

(52) U.S. Cl.
CPC .................................... *B66B 1/285* (2013.01)

(58) Field of Classification Search
USPC ............ 703/2, 5, 19; 187/290, 291, 293, 295, 187/380, 382
See application file for complete search history.

(56) References Cited

U.S. PATENT DOCUMENTS

| | | | | | |
|---|---|---|---|---|---|
| 3,774,729 | A * | 11/1973 | Winkler | ........................ | 187/295 |
| 4,094,385 | A * | 6/1978 | Maeda et al. | ................. | 187/291 |
| 4,181,197 | A * | 1/1980 | Tanabe et al. | ................. | 187/296 |
| 4,548,299 | A * | 10/1985 | Nomura | ........................ | 187/290 |
| 8,602,172 | B2 * | 12/2013 | Suzuki et al. | ................. | 187/382 |
| 2004/0200671 | A1 * | 10/2004 | Kugiya et al. | ................. | 187/293 |
| 2007/0012521 | A1 * | 1/2007 | Sakai et al. | ................... | 187/380 |
| 2011/0198160 | A1 * | 8/2011 | Suzuki et al. | ................. | 187/382 |

FOREIGN PATENT DOCUMENTS

| | | | |
|---|---|---|---|
| CN | 100569614 | C | 12/2009 |
| EP | 1 721 855 | A2 | 11/2006 |
| EP | 1 731 467 | A1 | 12/2006 |
| EP | 1 908 719 | A1 | 4/2008 |
| JP | 2005 170537 | | 6/2005 |
| JP | 2006 315773 | | 11/2006 |
| JP | 2009 149425 | | 7/2009 |

OTHER PUBLICATIONS

International Search Report Issued Mar. 1, 2011 in PCT/JP10/07148 Filed Dec. 8, 2010.
Office Action issued Oct. 29, 2013 in German Patent Application No. 11 2010 005 324.3 (with English language translation).
Combined Chinese Office Action and Search Report issued Dec. 9, 2013 in Patent Application No. 2010800650027.9 With English Translation and English Translation of Category of Cited Documents.

* cited by examiner

*Primary Examiner* — Thai Phan
(74) *Attorney, Agent, or Firm* — Oblon, McClelland, Maier & Neustadt, L.L.P.

(57) ABSTRACT

Provided is a control device for an elevator to be operated with a speed pattern thereof being changed based on a load of the elevator, in which a control parameter is automatically adjusted in a short period so that the capability of a drive device is appropriately exhibited regardless of the magnitudes of travel resistance and mechanical loss that varies for each elevator, and consequently the elevator is operated with high efficiency, the control device including: a traveling model used for calculating the speed command value of the elevator; and means for automatically adjusting a parameter of the traveling model based on travel data during a travel of the elevator when the elevator is installed and adjusted.

10 Claims, 8 Drawing Sheets

CONTROL DEVICE FOR ELEVATOR

TECHNICAL FIELD

The present invention relates to a control device for an elevator capable of changing a travel speed depending on a load on an elevator.

BACKGROUND ART

A control device for adjusting acceleration/deceleration and the maximum speed by changing a speed command value provided to a motor depending on a load imposed on an elevator such as a carrying load of a car has been developed. A control device of this type controls the car to travel at a speed predetermined depending on a car load detected by a weighing device, a motor current, or the like, or a speed calculated based on the car carrying load.

For example, there has been proposed a control device including means for detecting a car carrying load, for changing a speed command value depending on the car carrying load and a travel distance to thereby adjust acceleration/deceleration and the maximum speed, in which the speed command value is calculated in advance anticipating an error of a weighing device and a loss in a system so as to prevent loads imposed on drive devices such as a motor and an inverter from becoming large considering the detection error of the weighing device and influence exerted by mechanical/electrical losses during a travel (refer to Patent Literature 1, for example).

However, the error and the loss in the system vary, and if the error and the loss in the system are small, the control is conservative so that the car travels at a speed lower than a speed which can be originally provided, resulting in a problem in that capabilities of the drive devices cannot be sufficiently exerted. Further, an empty weight of the car and a travel vary for each elevator installation, and hence it is necessary to calculate the speed command value considering influence from the variation, resulting in the problem in that the control similarly becomes conservative. In order to address this problem, there has been proposed a control device for comparing a travel state quantity during the travel and a threshold set in advance with each other, to thereby adjust the speed and the acceleration by means of learning (refer to Patent Literature 2, for example).

CITATION LIST

Patent Literature

[PTL 1]: JP 2003-238037 A
[PTL 2]: JP 2009-149425 A

SUMMARY OF INVENTION

Technical Problem

In a technology for optimally adjusting the speed depending on a load for each elevator, the conventional control device gradually optimizes parameters while the elevator is in operation, and hence traveling in various load states is necessary before the completion of the optimization, resulting in a problem in that it takes time to complete the adjustment.

The present invention is devised in view of the above-mentioned problem, and has an object of providing a control device for an elevator, for compensating a variation in travel resistance and mechanical loss for each elevator installation, and automatically adjusting control parameters within capabilities of drive devices while the number of times of activation is reduced when an elevator is installed and adjusted.

Solution to Problems

A control device for an elevator to be operated with a speed pattern thereof being changed based on a load on the elevator includes a travel model used for calculating a travel pattern for the load, in which a parameter of the travel model is identified by travel data during a travel of the elevator.

Advantageous Effects of Invention

The control device includes: the travel model used for calculating the speed command value for the elevator; and means for automatically adjusting the parameter of the travel model when the elevator is installed and adjusted. Therefore, the control device for compensating the travel resistance and the mechanical loss, which are different for each elevator, can thus be optimally adjusted in a short period. As a result, the car can be operated highly efficiently.

REFERENCE SIGNS LIST

1 parameter identification means, 2 parameter storage unit, 3 speed command calculation device, 4 motor control device, 13 load detector

DESCRIPTION OF EMBODIMENTS

First Embodiment

Figure 1:
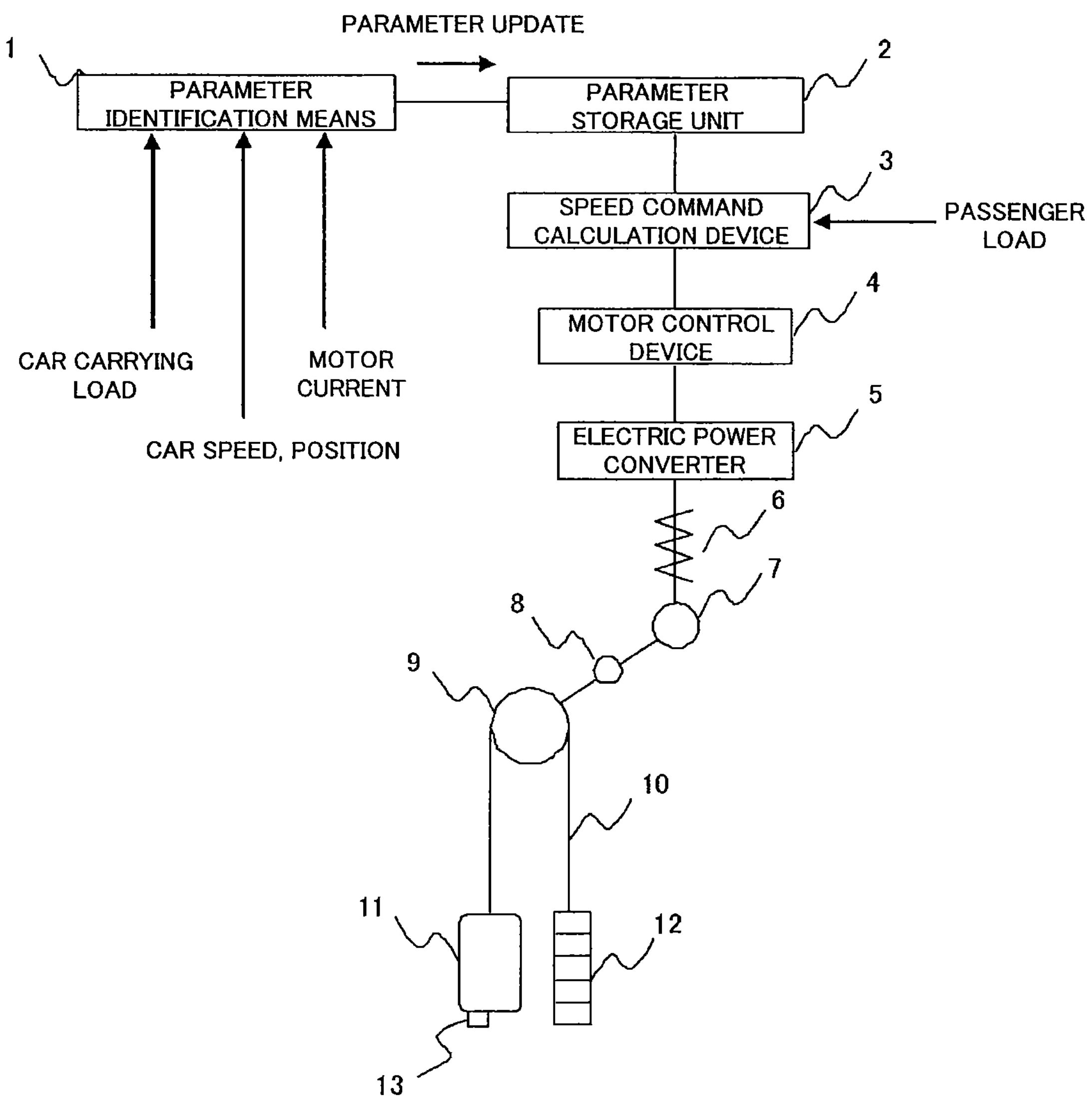
FIG. 1 A configuration diagram illustrating a configuration of a control device for an elevator according to the present invention.

FIG. 1 is a configuration diagram illustrating a first embodiment of the present invention. An elevator and a control device therefor according to this embodiment include parameter identification means 1, a parameter storage unit 2, a speed command calculation device 3, a motor control device 4, an electric power convertor 5, a current detector 6, a motor 7, a position/speed detector 8, a sheave 9, a rope 10, a car 11, a balance weight 12, and a load detector 13.

The car 11 and the balance weight 12 are coupled via the sheave 9 to the both ends of the rope 10 in the above-mentioned configuration, and the sheave 9 is rotated by the motor 7 to lift up/down the car 11. The motor 7 is driven by the electric power converter 5. The electric power converter 5 is an inverter, a matrix converter, or the like, and current control is applied to the electric power converter 5 by the motor control device 4. On this occasion, vector control is often used, and the current control is carried out by using the speed and magnetic pole positions of the motor 7 detected by the position/speed detector 8 and a motor current detected by the current detector 6. The motor control device 4 carries out the speed control so that the speed of the motor detected by the speed detector 8 follows a speed pattern generated by the speed command calculation device 3. The load detector 13 is a device for detecting a passenger load imposed on the car, and can be realized by a weighing device or the like. Moreover, the passenger load can be substituted by the motor current, a torque command for the motor, which is a control signal used inside the control device, or the like. The passenger load detected by the load detector 13 is fed to the speed command calculation device 3.

The parameter identification means 1, the speed command calculation device 3, and the motor control device 4 can be realized by a microcomputer on which a control program is implemented, or the like.

The parameter identification means 1 is means for identifying system parameters of the elevator required by the speed command calculation device 3 to calculate the speed command value. A detailed description is given later.

The parameter storage unit 2 stores the system parameters of the elevator identified by the parameter identification means 1. Note that, the parameter storage unit can be realized by a storage device such as a memory.

A description is now given of an automatic adjustment of speed patterns by using the parameter identification means 1, which is a feature of the present invention. The speed command calculation device 3 optimizes parameters used for calculating the speed patterns including patterns of the speed, the acceleration, and the jerk within permissible ranges of the motor, the electric power converter, and the like based on the passenger load, to thereby calculate the speed pattern for reducing the operation period. The control device according to the present invention includes a travel model used for calculating the speed pattern of the elevator, and sets the speed pattern based on the model.

For example, an example of the travel model of the elevator for determining a speed not exceeding a nominal electric power of the motor, for example, is expressed by the following equations.

$$V=Ht/\{L(|\beta-\gamma|+Er+H0)/(6120\eta p)\}\text{: during power running travel} \quad \text{Equation 1:}$$

$$V=Ht/\{L(|\beta-\gamma|+Er-H0)/(6120\eta r)\}\text{: during regeneration travel} \quad \text{Equation 2:}$$

In the equations, V denotes a speed (m/min) during a constant speed; Ht, a nominal electric power (kW) of the motor; L, a nominal carrying load (kg); β, a car load (taking a value from 0 to 1, 0 for no load, and 1 for a nominal carrying load); γ, a counter rate (represented by 0.5 if the 50% of the nominal carrying load balances with the balance weight); and Er, a detection error of the car load. Moreover, H0 denotes a travel resistance during the travel, and represents a loss due to a friction between a guide and a rail and a bending loss converted into those in a unit which is the same as that of the car load, for example.

Moreover, ηp and ηr denote efficiencies of the motor and the electric power converter during the power running travel and during the regeneration travel, respectively. The above-mentioned parameters other than a value detected and used by an external detection device (β in Equations 1 and 2) are stored as system parameters in the parameter storage unit, and the speed command calculation device 3 reads corresponding parameters from the parameter storage unit during the calculation of the speed.

When the elevator is activated, whether the travel is the power running travel or the regeneration travel is determined based on the detected car load β and a travel direction, and the speed is determined according to Equation 1 or 2. On this occasion, though the nominal electric power Ht and the counter rate γ are known, the detection error Er of the car load, the travel resistance H0, and the efficiencies ηp and ηr vary for each elevator. A speed can be calculated by determining, in advance, Er, H0, ηp, and ηr as worst expected values, but the design becomes conservative. According to the present invention, the above-mentioned conservativeness can be improved to realize an automatic adjustment of an optimum speed by using travel data during the travel to identify H0, ηp, and ηr of the above-mentioned parameters. Moreover, the parameters of the travel model can be identified for a small number of travels, and the optimal speed can be automatically adjusted in a short period. A description is now given of the method.

The denominators (L(|β−γ|+Er+H0)/(6120 ηp) and L(|β−γ|+Er−H0)/(6120 ηr)) of the right sides of Equations 1 and 2 correspond to torques generated by the motor. Thus, relationships of denominators to the torque components (torque currents) of the motor current during the power running travel and the regeneration travel can be represented by the following equations by using a known conversion coefficient Ki. Note that, Ki is a conversion coefficient for converting a calculated torque value for the nominal carrying load into a nominal torque current value of the motor.

The conversion coefficient Ki can be calculated from Equation 3 by assigning the nominal torque current value (design value) to the left side, and assigning 1 to β, an expected weighing device error to Er, and proper initial values (such as expected worst values) to H0 and ηp on the right side, for example.

$$iqp=Ki\times\{L(|\beta-\gamma|+Er+H0)/(6120\eta p)\}\text{:during power running travel} \quad \text{Equation 3:}$$

$$iqr=Ki\times\{L(|\beta-\gamma|+Er-H0)/(6120\eta r)\}\text{: during regeneration travel} \quad \text{Equation 4:}$$

In the equations, iqp and iqr respectively denote the torque components of the motor current during the power running travel and the regeneration. According to the present invention, H0, ηp, and ηr are identified following steps illustrated in FIG. 2 when the elevator is installed.

First in Step S1, a rope unbalance amount is identified. The rope unbalance amount is a weight difference between a weight on the car side and a weight on the balance weight side of the rope 10 hung on the sheave 9, and changes depending on the position of the car. For example, when the car is at the lowest floor, almost all the rope load is applied as the rope unbalance amount on the car side, and when the car is at the highest floor, almost all the rope load is applied as the rope unbalance amount on the balance weight side. When the car is at the middle position, the rope unbalance amount is zero. The system parameters are identified by using Equations 3 and 4 according to this embodiment, but Equations 3 and 4 are models not containing (eliminating) influence of the rope unbalance amount. Thus, the rope unbalance amount depending on the car position is identified in order to remove the rope unbalance amount in this step, and is stored in the parameter storage unit 2. The rope unbalance amount is acquired from an increase in torque current when the car is controlled to travel at a preset proper speed from the highest floor to the lowest floor. This is further described below referring to FIG. 3.

Figure 3:
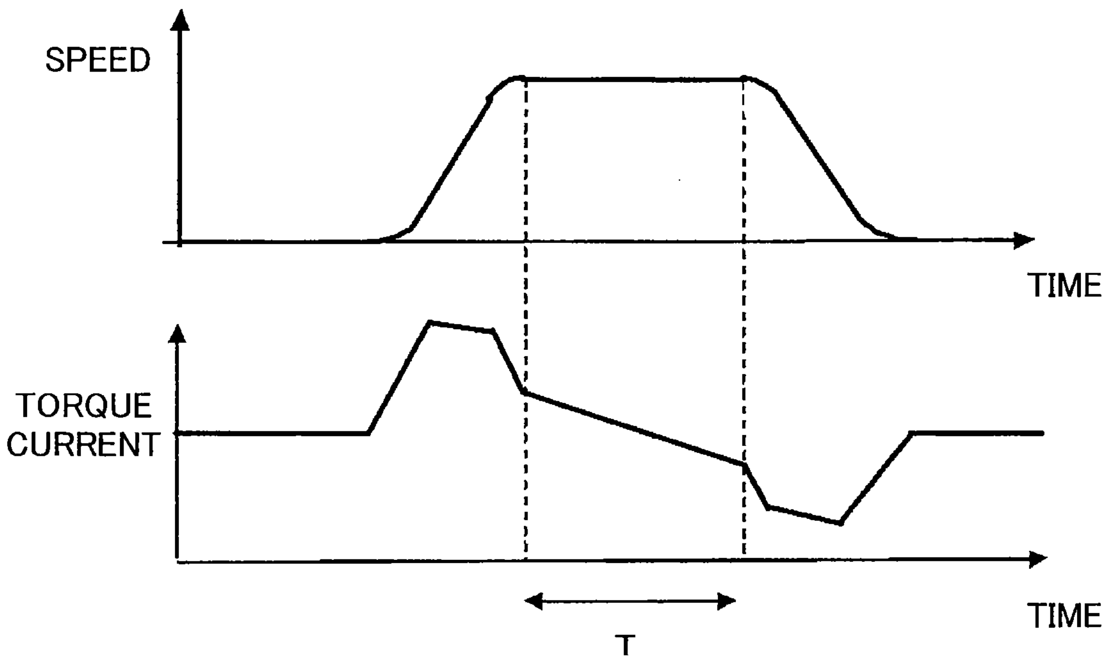
FIG. 3 A graph illustrating a change in a torque current during a travel according to the first embodiment.

FIG. 3 shows the car speed (upper row), and the torque current (lower row) when the car is controlled to travel from the highest floor to the lowest floor while the car is empty. The change in torque current with respect to a travel amount of the car, namely the rope unbalance amount can be acquired with respect to the car position by measuring a change in the torque current in a section T in which the car is at a constant speed. The rope unbalance amounts are acquired in two ways during the power running travel and during the regeneration travel respectively corresponding to Equations 3 and 4, respectively, and the acquisition can be carried out for the upward travel and the downward travel for the same carrying load (such as in the state in which the car is empty).

Next in Step S2, the elevator is controlled to travel at a 0%-load, namely in a state in which the car is empty, and time-series data of the torque current value is acquired. This data acquisition is carried out in two ways, during the upward travel (regeneration) and during the downward travel (power running travel).

Next in Step S3, the elevator is controlled to travel carrying a test weight in the car at a 50%-load, namely in a state in which the car and the balance weight are balanced, and the torque current on this occasion is acquired. When the load is 50%, the upward travel and the downward travel are both in the same load state of the power running travel, and the torque current may be acquired for any one of the travels.

Next in Step S4, the system parameters of the elevator are identified by using the torque currents acquired in Steps S2 and S3, and the rope unbalance amount acquired in Step S1. A description is now given of a method thereof.

First, the rope unbalance component is removed from the time series data of the torque current value for the upward travel acquired in Step S2. The removal is carried out by extracting a current for the travel at the constant speed, and subtracting a current component corresponding to the rope unbalance amount for the upward travel acquired in Step S1. On this occasion, the time series data of the torque current for the travel at the constant speed presents ideally a constant value, but the time series data actually fluctuates due to disturbance and the like, and an average value of the currents is thus acquired. This value is denoted by iqr0.

Then, the same processing as of that for the upward travel is carried out for the torque current for the downward travel acquired in Step S2, and a value acquired as a result of the removal of the current component corresponding to the rope unbalance amount for the downward travel and the averaging is denoted by iqp0. Then, a current at the 50%-load is acquired by means the same steps as of those for acquiring iqp0 for the torque current acquired in Step S3. This value is set to iqp50.

Then, the system parameters are identified by using Equations 3 and 4. The test weight is used at the time of the installation and hence the car carrying load is thus known, and the weighing device error Er is zero. Therefore, the following equations acquired by assigning the torque current for each of the loads acquired as described above, the corresponding load value, and Er=0 to Equations 3 and 4 hold.

$$iqp0=Ki\times\{L(|0-\gamma|+H0)/(6120\eta p)\} \quad \text{Equation 5:}$$

$$iqp50=Ki\times\{L(|0.5-\gamma|+H0)/(6120\eta p)\} \quad \text{Equation 6:}$$

$$iqr0=Ki\times\{L(|0-\gamma|-H0)/(6120\eta r)\} \quad \text{Equation 7:}$$

There are three unknown system parameters, H0, ηp, and ηr in Equations 5, 6, and 7, and the number of the simultaneous equations is three. Therefore, the system parameters, H0, ηp, and ηr can thus be acquired from the above-mentioned equations. The system parameters, H0, ηp, and ηr are identified by means of the above-mentioned steps in Step S4.

Next in Step S5, the speed calculation equations are updated by writing the system parameters identified in Step S4 in the parameter storage unit.

The system parameters used in Equations 1 and 2 are adjusted to the values corresponding to the real machine by the above-mentioned steps. Therefore, the system parameters, which are conventionally set expecting the worst values, are optimized, and an optimal speed can be set for each elevator. The system parameters can be adjusted by the total of three travels including the two travels in Step S2 and the one travel in Step S3, and the optimal adjustment can be carried out in a short period at the time of the installation.

The rope unbalance is zero when the car is exactly at the middle position between the highest floor and the lowest floor, the process of removing the rope unbalance amount in Steps S1 and S4 can be omitted by using in Step S4 the current values when the car is at the middle position out of the torque current values acquired in Steps S2 and S3.

Moreover, according to this embodiment, the example in which the system parameters of the elevator are identified and adjusted by controlling the car to travel at the 0%-load and the 50%-load has been described. However, it is only necessary to use a combination of loads different in the weight difference between the car and the balance weight, and the identification and the adjustment can be carried out for the 0%-load and a 25%-load (it should be understood that a similar effect is obtained).

Moreover, according to this embodiment, the example in which the torque component of the detected value of the motor current is used to identify the system parameters has been described. However, the torque command value or the torque current command value, which is the control signal, may be used in place of the torque component of the detected value of the motor current.

Second Embodiment

According to this embodiment, a description is given of a case where the acceleration out of the speed patterns is automatically adjusted within the maximum permissible torque of the motor based on the passenger load. An example of the travel model of the elevator for determining the acceleration α is represented by the following equations.

$$\alpha=\{T\max-L(|\beta-\gamma|+Er+H0)/(6120\eta p)\}/\{(Ja+Jb\times\beta)/\eta p\}\text{: during power running travel} \quad \text{Equation 8:}$$

$$\alpha=\{T\max-L(|\beta-\gamma|+Er-H0)/(6120\eta r)\}/\{(Ja+Jb\times\beta)/\eta r\}\text{: during regeneration travel} \quad \text{Equation 9:}$$

In the equations, Tmax denotes the maximum permissible torque of the motor upon acceleration and is known, and (Ja+Jb×β) denotes a quantity corresponding to an inertia of the elevator. The inertia of the elevator varies depending on the car load β, and can be represented by a linear function of β by using a parameter Jb for representing a portion dependent on the car load, and a parameter Ja for representing a portion independent of the car load.

Equations 8 and 9 are equations for acquiring the acceleration α which assigns a remaining total torque acquired by subtracting an unbalance torque component corresponding to the difference between the weight on the car side and the weight of the balance weight of the elevator from the maximum permissible torque Tmax of the motor to the acceleration, and can be used to acquire an acceleration so that the torque of the motor upon acceleration is Tmax. In other words, the equations are optimal in terms of acquiring the maximum value of the acceleration corresponding to the permissible limit of the motor. It should be understood that, when Tmax is set to a value smaller than the actual permissible limit value of the motor, the acceleration can be set with a margin of the torque of the motor.

The above-mentioned parameters other than a value detected and used by an external detection device (β in Equations 8 and 9) are stored as system parameters in the parameter storage unit, and the speed command calculation device 3 reads relevant parameters from the parameter storage unit during the calculation of the speed.

When the elevator is activated, whether the travel is the power running travel or the regeneration travel is determined based on the detected car load β and the travel direction, and the acceleration is determined according to Equation 8 or 9. On this occasion, the optimal acceleration can be automatically adjusted by identifying H0, ηp, ηr, Ja, and Jb out of the above-mentioned parameters by using the travel data during the travel as in the first embodiment. A description is now given of the method thereof. H0, ηp, and ηr can be identified by the method described in the first embodiment. A description is now mainly given of a method of identifying Ja and Jb.

In the first embodiment, the torque currents during the constant-speed travel are represented by Equations 3 and 4. The equations extended to torque currents during an accelerated travel are represented by Equations 10 and 11:

$$iqp\_a=Ki\times\{L(|\beta-\gamma|+Er+H0)/(6120\eta p)+\alpha\therefore(Ja+Jb\times\beta)/\eta p\}\text{: during power running travel}\quad\text{Equation 10:}$$

$$iqr\_a=Ki\times\{L(|\beta-\gamma|+Er-H0)/(6120\eta r)+\alpha\times(Ja+Jb\times\beta)/\eta r\}\text{: during regeneration travel}\quad\text{Equation 11:}$$

In the equations, iqp_a and iqr_a respectively denote the torque components of the motor current respectively during the power running travel and during the regeneration. Moreover, α denotes the acceleration of the car.

Figure 2:
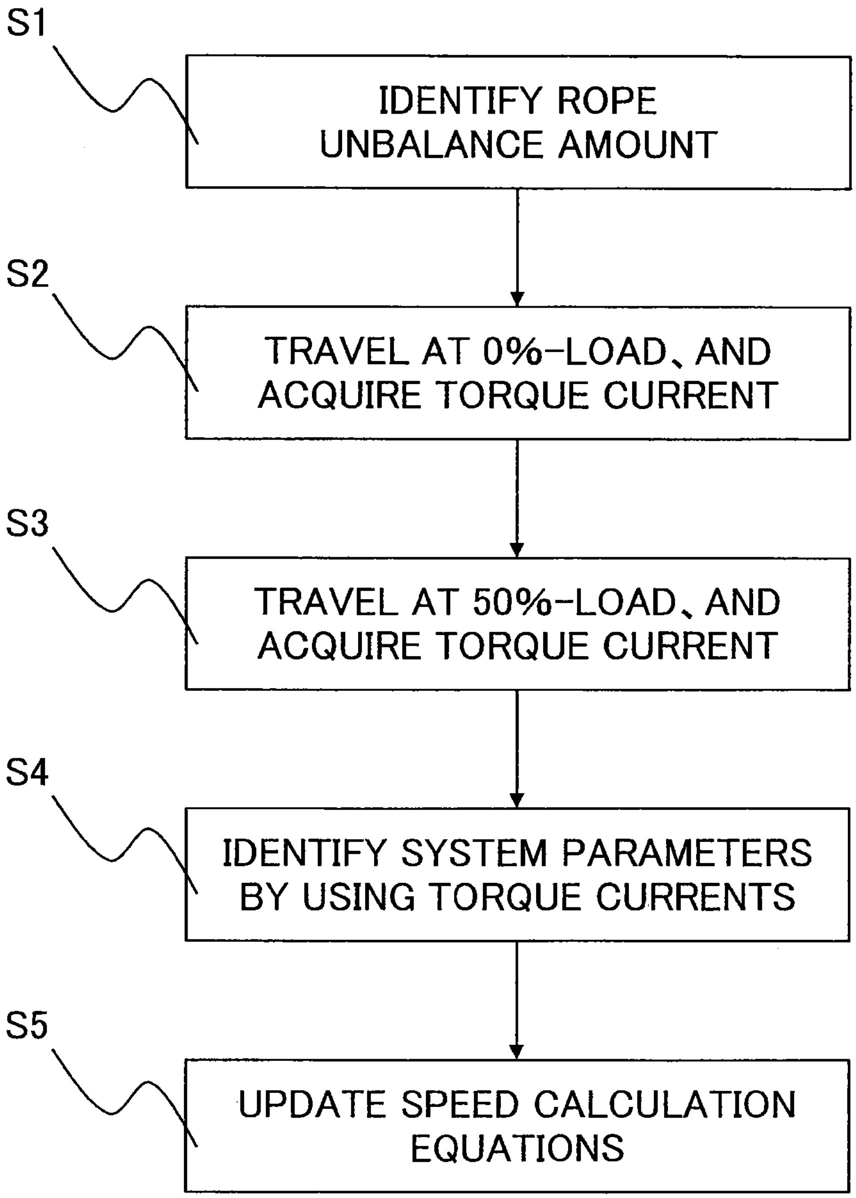
FIG. 2 A diagram illustrating an operation flowchart of the control device for the elevator according to a first embodiment.
Figure 4:
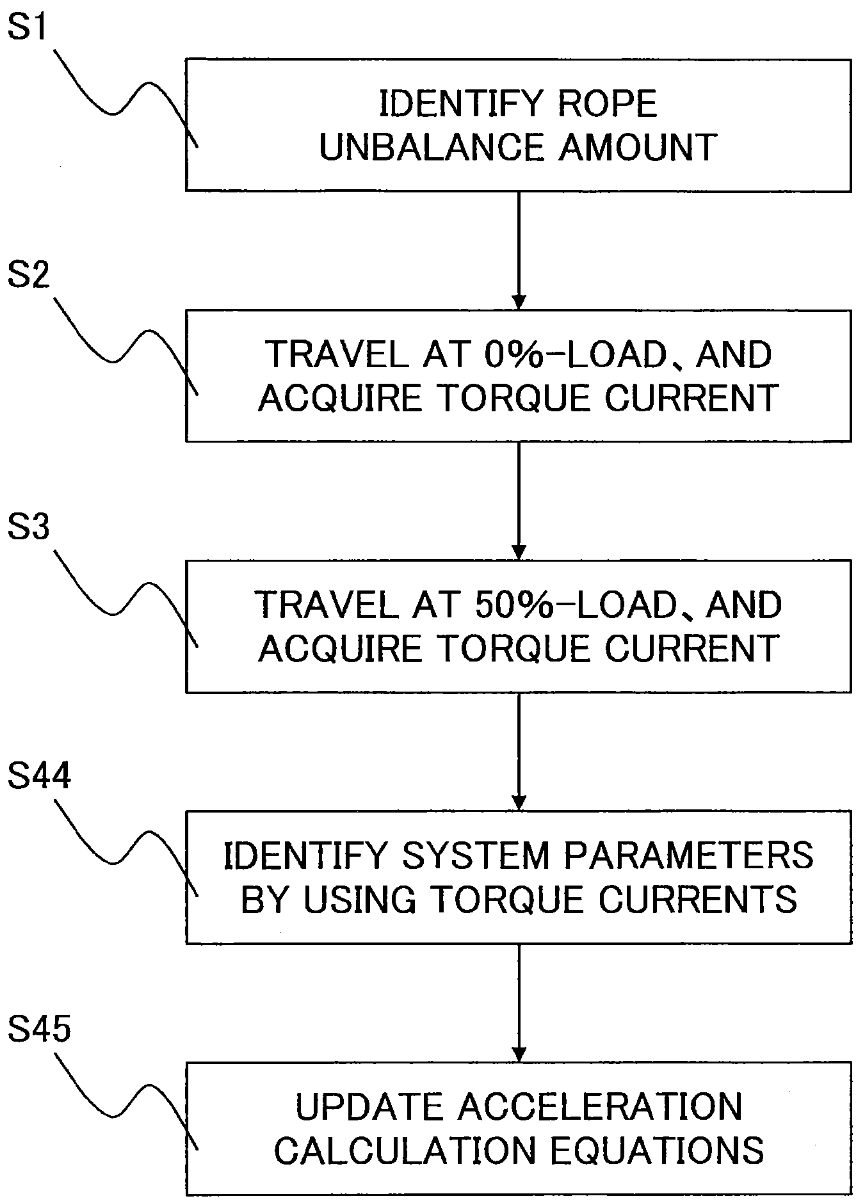
FIG. 4 A diagram illustrating the operation flowchart of the control device for the elevator according to a second embodiment.

According to this embodiment, H0, ηp, ηr, Ja, and Jb are identified following steps illustrated in FIG. 4 when the elevator is installed. In FIG. 4, steps denoted by the same reference symbols as FIG. 2 are the same as those of the first embodiment.

Steps S1-S3 are the same as the steps described in the first embodiment, and a description thereof is therefore omitted.

In Step S44, the system parameters of the elevator are identified by using the torque currents acquired in Steps S2 and S3, and the rope unbalance amount acquired in Step S1. First, H0, ηp, and ηr are identified by the same method as described in the first embodiment. A description is now given of the method of identifying Ja and Jb.

Figure 5:
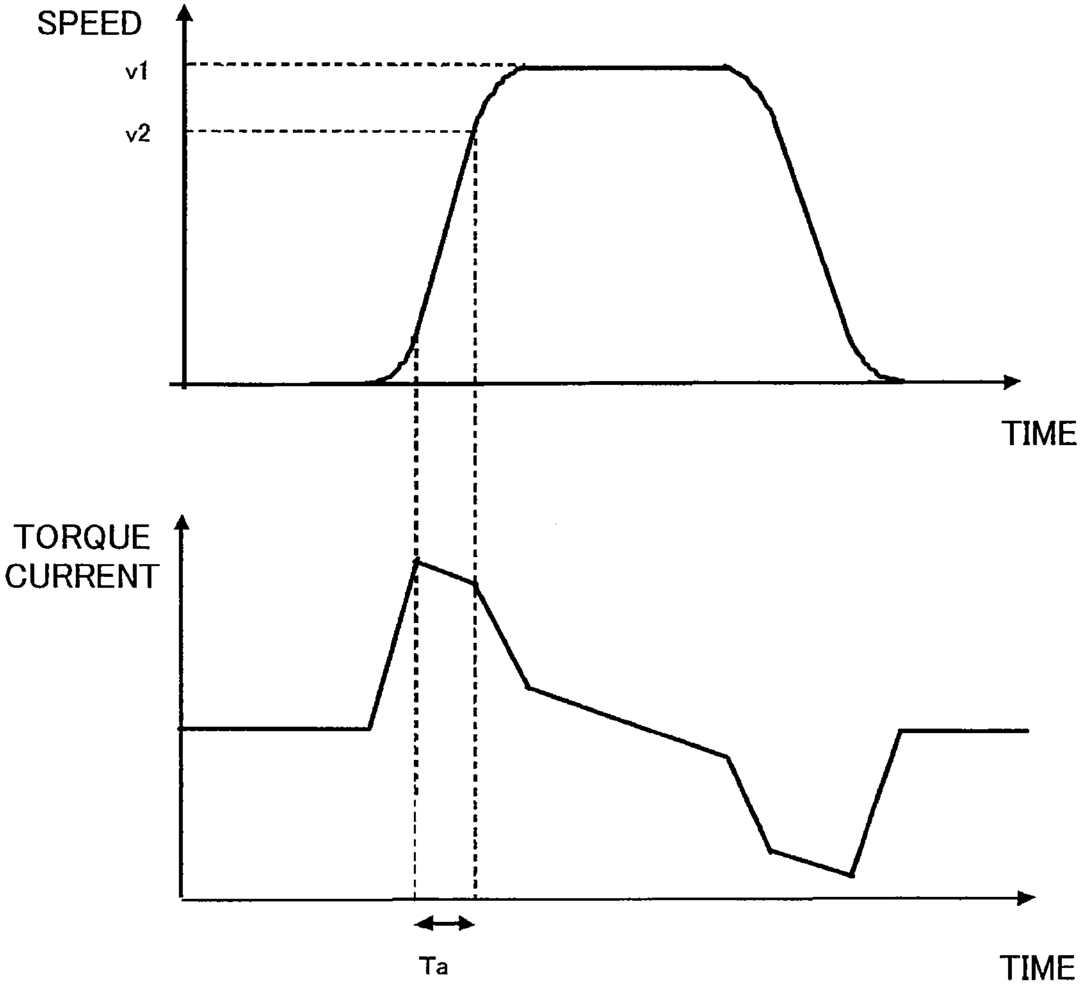
FIG. 5 A graph illustrating a change in a torque current during a travel according to the second embodiment.

First, a value is acquired by removing the rope unbalance amount from the torque current value in a constant acceleration section Ta illustrated in FIG. 5 out of the torque currents acquired in Steps S2 and S3, and averaging resulting torque current values.

On this occasion, a torque current value acquired by applying the above-mentioned processing to the torque current value upon the downward travel acquired in Step S2 is denoted by iqp0_a, and a torque current value acquired by applying the same processing to the torque current value acquired in Step S3 is denoted by iqp50_a.

Next in Step S44, the system parameters are identified by using Equation 10. The test weight is used at the time of the installation and hence the car carrying load is known, and the weighing device error Er is zero. Moreover, a value of the acceleration α is known (set to αt).

Therefore, the following equations acquired by assigning the torque current for each of the loads acquired as mentioned before, the corresponding load value, Er=0, and the known acceleration at to Equation 10 hold.

$$iqp0\_a=Ki\times\{L(|0-\gamma|+H0)/(6120\eta p)+\alpha t\times(Ja+Jb\times 0)/\eta p\}\quad\text{Equation 12:}$$

$$iqp50\_a=Ki\times\{L(|0.5-\gamma|+H0)/(6120\eta p)+\alpha t\times(Ja+Jb\times 0.5)/\eta p\}\quad\text{Equation 13:}$$

In Equations 12 and 13, H0, ηp, and ηr are acquired in the above-mentioned steps, and are thus known. Thus, there are two unknown parameters, Ja and Jb, and the two simultaneous equations, and the system parameters Ja and Jb can thus be acquired from Equations 12 and 13 above.

Next in Step S45, the system parameters are updated by writing the system parameters identified in Step S44 in the parameter storage unit.

The system parameters used in Equations 8 and 9 are adjusted to the values optimal for the real machine by the above-mentioned steps, and hence the system parameters, which are conventionally set expecting the worst values, are optimized. Therefore, an optimal acceleration can be set for each elevator.

According to this embodiment, only Equation 10 is used in Step S44, but Equation 11 may be used. On this occasion, Equation 12 is rewritten to Equation 14 below by using a torque current iqr0_a acquired upon the upward travel in Step S2.

$$iqr0\_a=Ki\times\{L(|0-\gamma|-H0)/(6120\eta r)+\alpha t\times(Ja+Jb\times 0)/\eta r\}\quad\text{Equation 14:}$$

Moreover, according to this embodiment, the example in which the system parameters of the elevator are identified and adjusted by controlling the car to travel at the 0%-load and the 50%-load has been described. However, it is only necessary to use a combination of loads different in the weight difference between the car and the balance weight, and the identification and the adjustment can be carried out for the 0%-load and the 25%-load.

Moreover, the torque current upon the acceleration is used when the Ja and Jb are identified in Step S44, but the torque current upon the constant deceleration may be used instead.

Moreover, though Equations 8 and 9 for setting the condition so as not to exceed the maximum permissible torque are used as the travel model of the elevator for determining the acceleration α according to this embodiment, the following travel model of setting a condition so as not to exceed the maximum permissible electric power upon acceleration may be used.

$$\alpha=\{H\max/V-L(|\beta-\gamma|+Er+H0)/(6120\eta p)\}/\{(Ja+Jb\times\beta)/\eta p\}\text{: during power running travel}\quad\text{Equation 15:}$$

$$\alpha=\{H\max/V-L(|\beta-\gamma|+Er-H0)/(6120\eta r)\}/\{(Ja+Jb\times\beta)/\eta r\}\text{: during regeneration travel}\quad\text{Equation 16:}$$

In Equations 15 and 16, Hmax denotes the maximum permissible electric power of the motor upon acceleration, and V denotes a speed at a travel at a constant speed (v1 in FIG. 5) or a speed at which the acceleration starts decreasing from the constant acceleration (v2 in FIG. 5). Note that, Hmax is known and V can be acquired from Equations 1 and 2 if the load ratio β is determined.

In this way, the acceleration can be optimally adjusted by a few travels (three travels according to this embodiment, and data of two travels out of three are used for the optimal adjustment of acceleration), and can thus be adjusted in a short period.

Third Embodiment

Figure 6:
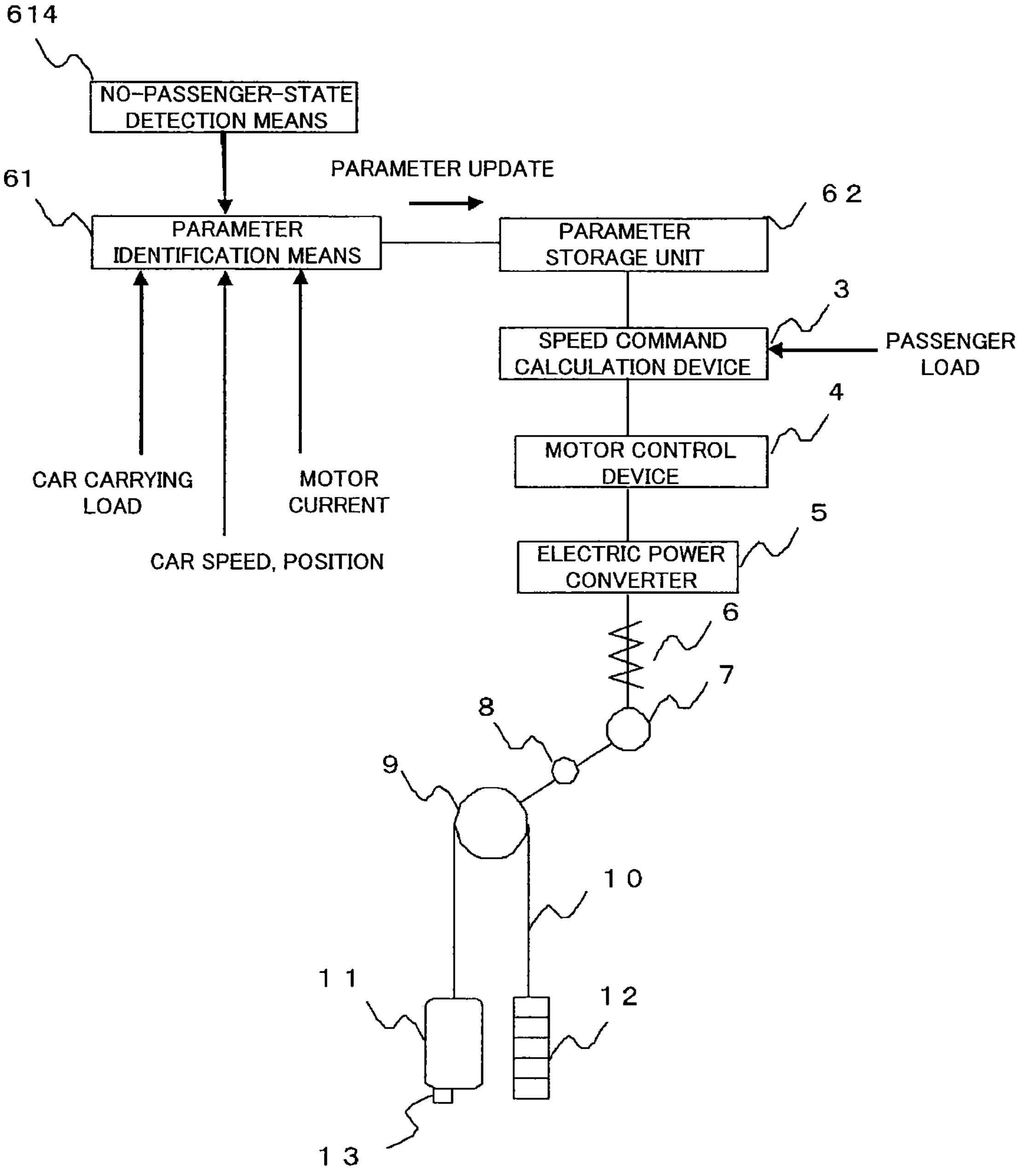
FIG. 6 A configuration diagram illustrating a configuration of the control device for the elevator according to a third embodiment.

FIG. 6 is a configuration diagram illustrating a third embodiment of the present invention. The elements denoted by the same reference numerals as those in FIG. 1 operate in the same way as in the first and second embodiments. A feature of this embodiment is that the system parameters are periodically readjusted. This readjustment is carried out when the car load of the elevator is in a determinable loaded state. In this embodiment, a description is given of an example in which the readjustment is carried out when no passengers are in the car as the situation in which the car load can be determined.

No-passenger-state detection means 614 is means for detecting that the car is empty (no carrying load). Various methods can be used to determine whether passengers are in the car or not. For example, there are a method of detecting absence/presence of a human by means of a camera inside the car or the like, a method of determining the no-passenger state when a destination is not registered in the car and the elevator is operated by a call from a hall, and a method of simultaneously using the above-mentioned method and a value of the load detector. Moreover, the unoccupied state may be determined when the elevator is not operating and a call registration does not occur for a certain period in the night or the like, so as to generate the no-passenger travel state.

Parameter identification means 61 carries out a periodical readjustment of the system parameters during the no-passenger travel in addition to the automatic adjustment of the system parameters during the installation, which is described in the first and second embodiments. A parameter storage unit 62 also records historical values of the system parameters of the elevator. In other words, the parameter storage unit 62 also stores the values before the readjustment. Further, the parameter storage unit 62 also stores historical values of the travel data used to identify the system parameters.

Figure 7:
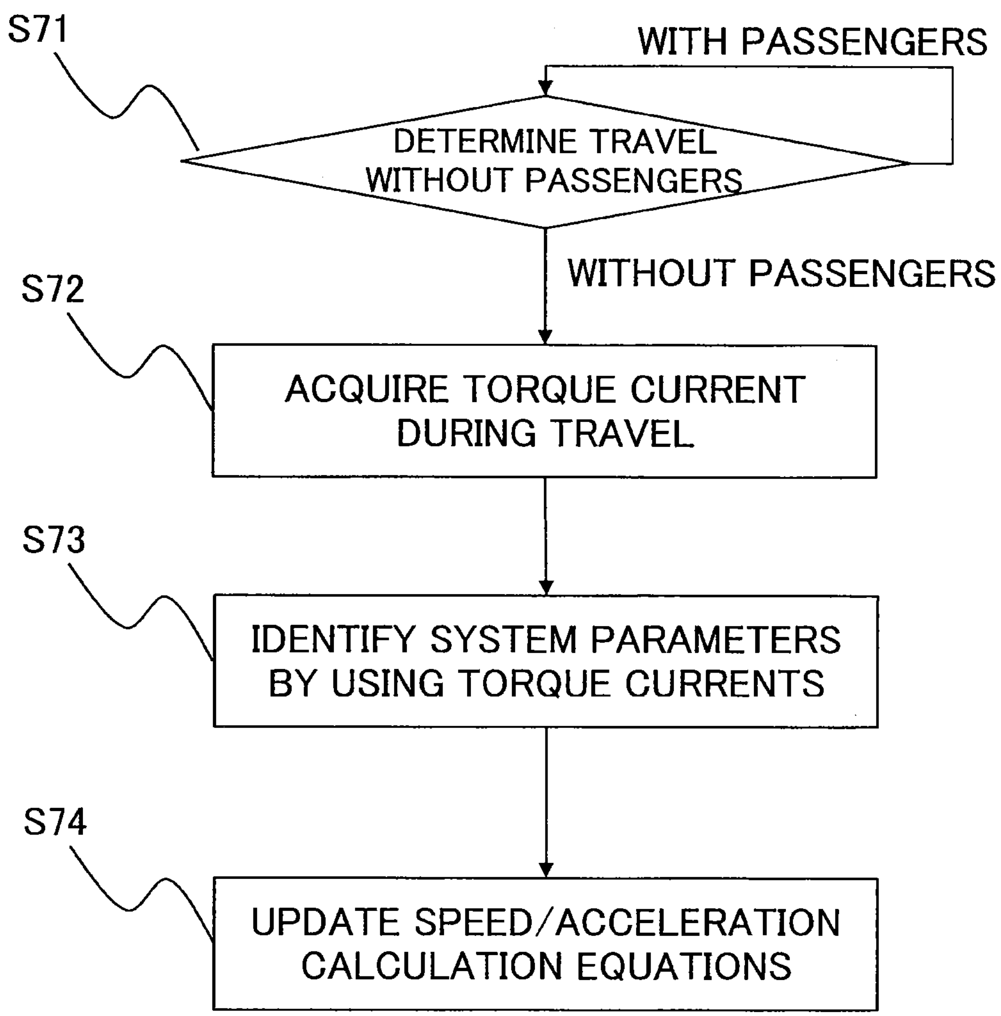
FIG. 7 A diagram illustrating an operation flowchart of the control device for the elevator according to the third embodiment.

The periodical readjustment of the parameters is carried out according to a flowchart of FIG. 7 in this embodiment. A description is now given of steps therefor.

First, it is determined in Step S71 by the no-passenger-state detection means 614 whether the no-passenger state is present or not for each travel in order to readjust the parameters. When it is determined that the no-passenger travel state is not present, the processing waits until the next travel (does not carry out the readjustment), and when the no-passenger state is present, the processing proceeds to Step S72. In Step S72, the torque current upon the travel in the no-passenger state is acquired and stored in the parameter storage unit. In Step S73, the system parameters are then identified by using the torque current value acquired in Step S72. A description is now given of the method.

Figure 8:
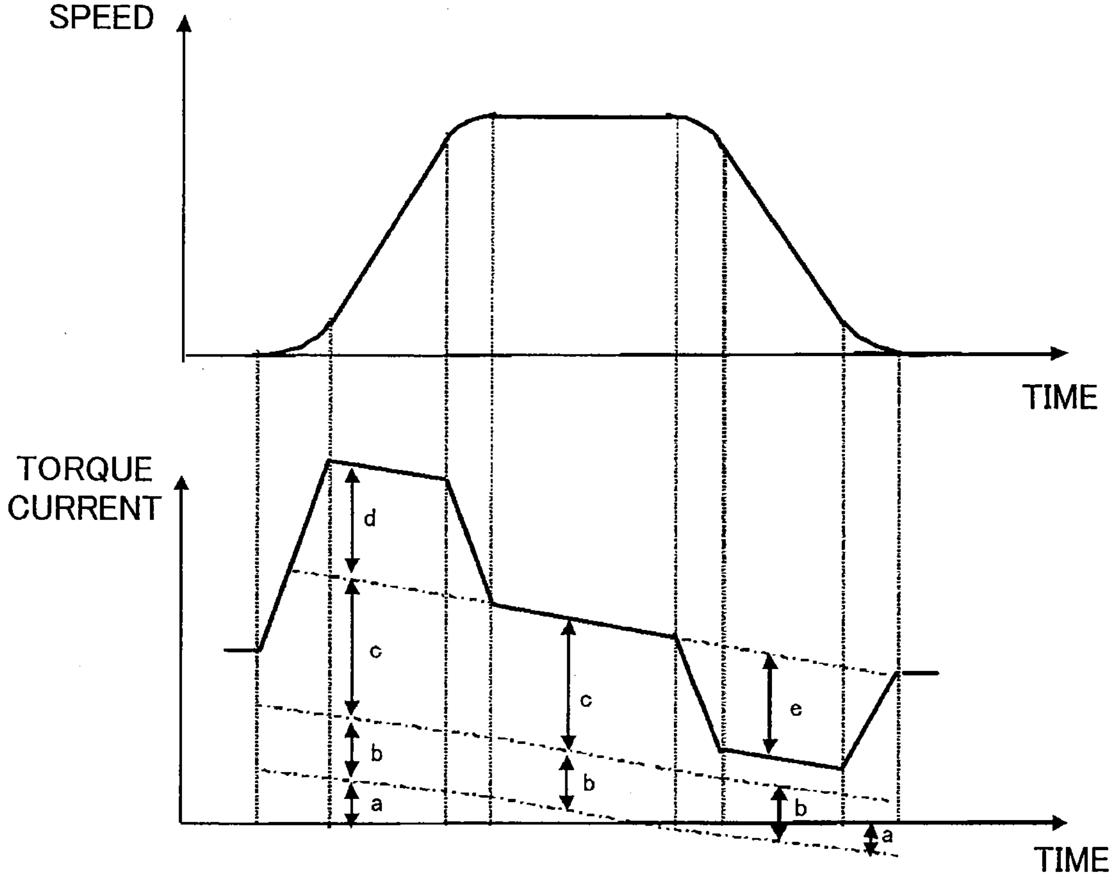
FIG. 8 A graph illustrating components of a torque current during a travel according to the third embodiment.

FIG. 8 illustrates a car speed and a torque current pattern for the downward travel of the car during the no-passenger travel. In the torque current, a portion a represents a rope unbalance component; b, a travel loss component; c, an unbalance component between the car weight and the weight of the balance weight; d, an inertial torque component upon acceleration; and e, an inertial torque component upon deceleration. In FIG. 8, the rope unbalance is positive when the car is above the middle position and is negative when the car is below the middle position, and hence the sign is inverted halfway. The same holds true for the inertial torque e, which takes a negative value upon deceleration. The magnitudes of the current of b to e are respectively represented by iqb, iqc, iqd, and iqe, and those are associated with Equation 10 in the following way.

$$iqb=Ki\times H0/(6120\eta p) \quad \text{Equation 17:}$$

$$iqc=Ki\times L(|0-\gamma|)/(6120\eta p) \quad \text{Equation 18:}$$

$$iqd=Ki\times\alpha t\times(Ja+Jb\times 0)/\eta p \quad \text{Equation 19:}$$

$$iqe=Ki\times\alpha d\times(Ja+Jb\times 0)/\eta p \quad \text{Equation 20:}$$

Note that, the magnitudes of the acceleration and the deceleration are respectively denoted by αt and αd. αt and αd are known.

First, the rope unbalance component of a can be removed by the same method as that of the first embodiment. Then, the magnitude of d or e is acquired. This magnitude is acquired as a difference between the torque current at the constant acceleration or the constant deceleration and the torque current at the constant speed.

Moreover, though b and c cannot be acquired independently, the sum thereof can be acquired from the torque current upon the constant speed.

On this occasion, it is seen from Equation 19 that a ratio of a value (denoted by iqd0) corresponding to d of the torque current acquired at the 0%-load upon installation adjustment to a value (iqd) corresponding to d upon readjustment is an inversed ratio of an efficiency (denoted by ηp0) identified during a travel upon installation to ηp upon readjustment.

In other words, a relationship iqd/iqd0=ηp0/ηp holds, and ηp is thus acquired from:

$$\eta p=\eta p0\times iqd0/iqd \quad \text{Equation 21:}$$

Note that, the torque current iqd upon deceleration may be used to readjust ηp. Alternatively, an average of both may be used.

Moreover, an efficiency ηr may be identified again during the upward travel by the steps mentioned before in the regeneration direction.

Then, H0 is to be identified. H0 can be acquired from Equations 17, 18, and 21 and the torque current (actually measured value of iqb+iqc, denoted by iqbc) at a constant speed. Now, rip is identified, and can be assigned to the right side of Equation 18, thereby acquiring a value of iqc. A value acquired by subtracting iqc from the torque current (iqbc) at the constant speed is iqb, and is equal to Equation 17. Therefore, H0 can be acquired.

In other words, H0 can be identified again by Equation 22 below.

$$H0=(iqbc-iqc)\times 6120\eta p/Ki \quad \text{Equation 22:}$$

There has been described the example in which H0 is identified again by using the torque current value during the power running travel, but H0 can be determined by a method similar to the above-mentioned method by using the torque current value during the regeneration travel. Moreover, H0 may be identified again both during the power running travel and the regeneration travel, and the identified values of H0 may be averaged.

Further, the re-identification of the parameters may be repeated again for several times, and averages thereof may be used.

According to the present invention, the system parameters of the elevator are periodically readjusted. Therefore, the system parameters can be automatically readjusted considering influence of changes with time of the elevator, and it is possible to control each elevator to travel in an optimal speed pattern. Moreover, the readjustment can be completed after a few travels, and can be finished in a short period.

The invention claimed is:

1. A control system for an elevator, comprising:

a sensor to sense a parameter of the elevator, when the elevator is moving;

a calculator used to calculate a speed pattern to set a speed of the elevator, using information from the sensor obtained when the elevator is moving;

a memory to store the speed pattern which sets a speed of the elevator; and a motor controller which controls movement of the elevator using the speed pattern stored in the memory.

2. A control system for an elevator according to claim 1, wherein the speed pattern comprises a pattern of a velocity or a pattern of an acceleration of the elevator.

3. A control system for an elevator according to claim 1, wherein the calculator calculates the speed pattern using the information from the sensor which was obtained while a carrying load state of a car is changed in at least two ways when the elevator is installed.

4. A control system for an elevator according to claim 1, wherein the calculator calculates the speed pattern using a loss during the movement of the elevator and an efficiency of a system.

5. A control system for an elevator according to claim 1, wherein the calculator calculates the speed pattern using a torque component of a motor current or a torque command value sensed by the sensor.

6. A control system for an elevator according to claim 1, wherein the calculator calculates the speed pattern using sensor information acquired when the elevator travels in an empty state.

7. A control system according to claim 1, wherein:

the calculator calculates the speed pattern using a model which includes the information from the sensor.

8. A control system according to claim 1, wherein:

the sensor is used to sense the parameter of the elevator, when the elevator is moving during a testing period.

9. A control system according to claim 1, wherein:

the motor controller controls movement of the elevator using the speed pattern and a load of the elevator.

10. A control system according to claim 1, wherein:

the calculator calculates the speed pattern using the information from the sensor obtained when the elevator is moving under control of the motor controller which is operating using another speed pattern.

* * * * *